United States Patent
Watanabe (10) Patent No.: US 10,496,937 B2
(45) Date of Patent: Dec. 3, 2019

(54) TRAVEL SERVICE INFORMATION DISPLAY SYSTEM, TRAVEL SERVICE INFORMATION DISPLAY METHOD, TRAVEL SERVICE INFORMATION DISPLAY PROGRAM, AND INFORMATION RECORDING MEDIUM

(71) Applicant: Rakuten, Inc., Tokyo (JP)

(72) Inventor: Taichi Watanabe, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 573 days.

(21) Appl. No.: 14/779,343

(22) PCT Filed: Apr. 26, 2013

(86) PCT No.: PCT/JP2013/062498
§ 371 (c)(1),
(2) Date: Sep. 23, 2015

(87) PCT Pub. No.: WO2014/174686
PCT Pub. Date: Oct. 30, 2014

(65) Prior Publication Data
US 2016/0071029 A1  Mar. 10, 2016

(51) Int. Cl.
*G06Q 10/02* (2012.01)
*G06Q 50/14* (2012.01)
(Continued)

(52) U.S. Cl.
CPC ......... *G06Q 10/02* (2013.01); *G06Q 30/0201* (2013.01); *G06Q 30/0641* (2013.01);
(Continued)

(58) Field of Classification Search
CPC ............... G06Q 10/02; G06Q 30/0282; G06Q 30/0649; G06Q 50/14; G06F 15/5866; G06F 16/686; G06F 16/7867
See application file for complete search history.

(56) References Cited

U.S. PATENT DOCUMENTS 6,446,045 B1 * 9/2002 Stone ............... G06Q 10/02
705/26.1
2002/0147619 A1 * 10/2002 Floss ............... G06Q 10/02
705/5
(Continued)

FOREIGN PATENT DOCUMENTS

JP 2011-158950 A 8/2011
WO WO-2011122583 A1 * 10/2011

OTHER PUBLICATIONS

Pu, A comparative analysis of web image and textual queries, 2005, Online Information Review, vol. 29, No. 5, pp. 457-67.*
(Continued)

*Primary Examiner* — Daniel Vetter
(74) *Attorney, Agent, or Firm* — Sughrue Mion, PLLC (57) ABSTRACT

To provide a travel service information display system for controlling a display manner for displaying travel service information in consideration of subjective evaluation by a user having used the travel service. A travel service information display system (10) includes an image attribute information obtaining unit (312) for obtaining image attribute information on each of a plurality of images relevant to a travel service; a review information obtaining unit (320) for obtaining review information inputted by a user of the travel service; an evaluation unit (330) for making evaluation of the travel service with respect to a predetermined evaluation item based on the review information; and a display manner control unit (352) for controlling a display manner for the plurality of images based on the image attribute information and a result of the evaluation with respect to the evaluation item corresponding to the image attribute information.

8 Claims, 10 Drawing Sheets

(51) Int. Cl.
*G06Q 30/02* (2012.01)
*G06T 11/60* (2006.01)
*G06Q 30/06* (2012.01)
*G06T 11/40* (2006.01)

(52) U.S. Cl.
CPC .............. *G06Q 50/14* (2013.01); *G06T 11/40* (2013.01); *G06T 11/60* (2013.01)

(56) References Cited

U.S. PATENT DOCUMENTS

| | | | | |
|---|---|---|---|---|
| 2003/0217052 A1* | 11/2003 | Rubenczyk | ....... | G06F 17/30643 |
| 2004/0049413 A1* | 3/2004 | Momma | ................ | G06Q 10/02 |
| | | | | 705/5 |
| 2007/0136270 A1* | 6/2007 | Harney | .................. | G06Q 10/02 |
| 2008/0077454 A1* | 3/2008 | Shepherd | ........... | G06Q 10/02 |
| | | | | 705/5 |
| 2009/0024591 A1* | 1/2009 | Miyasaka | ................ | G06F 16/50 |
| 2009/0281875 A1* | 11/2009 | Tarka | ..................... | G06Q 10/02 |
| | | | | 705/5 |
| 2009/0313055 A1* | 12/2009 | Martin | .................. | G06Q 10/02 |
| | | | | 705/6 |
| 2010/0312586 A1* | 12/2010 | Drefs | ..................... | G06Q 10/02 |
| | | | | 705/5 |
| 2011/0161071 A1* | 6/2011 | Duong-van | ....... | G06F 17/30867 |
| | | | | 704/9 |
| 2012/0127066 A1* | 5/2012 | Iida | ..................... | G11B 27/322 |
| | | | | 345/84 |
| 2012/0209842 A1* | 8/2012 | Bettridge | ........... | G06Q 30/0631 |
| | | | | 707/736 |
| 2012/0239661 A1* | 9/2012 | Giblin | .................... | H04L 65/60 |
| | | | | 707/741 |
| 2013/0024391 A1* | 1/2013 | Vakil | ..................... | G06Q 50/14 |
| | | | | 705/319 |
| 2013/0036139 A1* | 2/2013 | Kung | ................... | G06Q 10/025 |
| | | | | 707/780 |
| 2013/0041902 A1* | 2/2013 | Swann | .............. | G06F 17/30864 |
| | | | | 707/737 |
| 2013/0060843 A1* | 3/2013 | Yamahara | .............. | G06Q 10/10 |
| | | | | 709/203 |
| 2013/0183022 A1* | 7/2013 | Suzuki | ............... | G06K 9/00718 |
| | | | | 386/241 |
| 2013/0332462 A1* | 12/2013 | Billmaier | .............. | G06F 16/686 |
| | | | | 707/741 |
| 2014/0114847 A1* | 4/2014 | Watanabe | .............. | G06Q 30/02 |
| | | | | 705/39 |
| 2014/0146464 A1* | 5/2014 | Abdelsamie | .......... | G06F 1/1628 |
| | | | | 361/679.41 |
| 2014/0156464 A1* | 6/2014 | Watanabe | .......... | G06Q 30/0623 |
| | | | | 705/26.61 |
| 2014/0164373 A1* | 6/2014 | Belyaev | .................. | G06F 16/48 |
| | | | | 707/736 |

OTHER PUBLICATIONS

Pu, A comparative analysis of web image and textual queries, Online Information Review, vol. 29, No. 5, pp. 457-467 (Year: 2005).*

International Search Report for PCT/JP2013/062498 dated Jun. 18, 2013.

* cited by examiner

PHOTO GALLERY

TRAVEL SERVICE USE HISTORY

| APPLICATION DATE | SERVICE USED | DATE OF USE | REVIEW |
|---|---|---|---|
| 2012/03/20 | ○× HOT SPRING | 2012/05/01 | INPUTTED |
| 2012/05/18 | ×× HOTEL | 2012/08/20 | INPUTTED |
| 2012/10/22 | △△ HOTEL | 2012/12/29 | INPUTTED |
| 2013/01/15 | ○○ INN | 2013/01/31 | SELECT ~731 |
| 2013/02/20 | △○ HOT SPRING | 2013/03/20 | SELECT |
|  |  |  |  |

| IMAGE ID | IMAGE DATA NAME | IMAGE ATTRIBUTE INFORMATION |
|---|---|---|
| 0001 | MAIN ENTRANCE.jpg | 1 (FACILITY) |
| 0002 | ROOM.jpg | 2 (ROOM) |
| 0003 | HOT SPRING.jpg | 3 (HOT SPRING) |
| 0004 | DINNER.jpg | 4 (FOOD) |
| 0005 | LANDLADY.jpg | 5 (STAFF) |

FIG.13

| EVALUATION ITEM | PREDETERMINED WORDS |
|---|---|
| 1 (FACILITY) | ENTRANCE  ARCHITECTURE  GATE  WALL  STONE PAVEMENT  LANTERN  DIGNIFIED PRESENCE |
| 2 (ROOM) | JAPANESE STYLE ROOM  WESTERN STYLE ROOM  CLEANLINESS  WIDE  SPACIOUS  NIGHT VIEW  SCENERY |
| 3 (HOT SPRING) | OUTDOOR BATH  ROCK BATH  HINOKI BATH  EFFECT  WARMING |
| 4 (FOOD) | JAPANESE FOOD  WESTERN STYLE FOOD  SASHIMI  BUFFET  WINE  JAPANESE SAKE  TASTY |
| 5 (STAFF) | BEAUTIFUL  CHEERFUL  COURTEOUS  POLITE  CONSIDERATION |

FIG.14

| NUMBER OF PEOPLE | PURPOSE | 1 (FACILITY) | 2 (ROOM) | 3 (HOT SPRING) | 4 (FOOD) | 5 (STAFF) |
|---|---|---|---|---|---|---|
| 1 | SIGHTSEEING | 129 | 351 | 1029 | 881 | 401 |
|   | BUSINESS | 52 | 201 | 150 | 132 | 83 |
| 2 | SIGHTSEEING | 326 | 422 | 2011 | 1522 | 281 |
|   | BUSINESS | 32 | 130 | 88 | 63 | 22 |
| FAMILY | SIGHTSEEING | 400 | 823 | 1822 | 1721 | 623 |
| ⋮ | ⋮ | ⋮ | ⋮ | ⋮ | ⋮ | ⋮ |

FIG.15

TRAVEL SERVICE INFORMATION DISPLAY SYSTEM, TRAVEL SERVICE INFORMATION DISPLAY METHOD, TRAVEL SERVICE INFORMATION DISPLAY PROGRAM, AND INFORMATION RECORDING MEDIUM

CROSS REFERENCE TO RELATED APPLICATIONS

This application is a National Stage of International Application No. PCT/JP2013/062498 filed Apr. 26, 2013, the contents of all of which are incorporated herein by reference in their entirety.

TECHNICAL FIELD

The present invention relates to a travel service information display system, a travel service information display method, a travel service information display program, and an information recording medium.

BACKGROUND ART

With development in communication technology and spread of communication terminal, a travel service information display system for providing via a network a user using a communication terminal with travel service information on accommodation facilities, package travels, and the like, in accordance with a requirement inputted has been developed and come to be widely used.

Patent Literature 1 discloses an accommodation booking server for introducing a sightseeing spot in accordance with a consumption tendency of a user.

CITATION LIST

Patent Literature

Patent Literature 1: Japanese Patent Laid-open Publication No. 2011-158950

SUMMARY OF INVENTION

Technical Problem

In a conventional travel service information display system, however, a display manner of an image in displaying travel service information is determined in advance by a travel service provider (an information provider who provides travel service information). Therefore, in order to display with emphasis, for example, an image relevant to a travel service that will be strongly impressive to a user among travel services to be provided, the information provider has to anticipate an impression to be received by a user, and decide the display manner.

The present invention has been conceived in view of the above, and a main object thereof is to provide a travel service information display system, a travel service information display method, a travel service information display program, and an information recording medium for controlling a display manner of an image in displaying travel service information in consideration of subjective evaluation by a user having used the service.

Solution to Problem

In order to achieve the above described object, a travel service information display system according to the present invention includes image attribute information obtaining means for obtaining image attribute information on each of a plurality of images relevant to a travel service; review information obtaining means for obtaining review information inputted by a user of the travel service; evaluation means for making evaluation of the travel service with respect to a predetermined evaluation item based on the review information; and display manner control means for controlling a display manner for the plurality of images based on the image attribute information and a result of the evaluation with respect to the evaluation item corresponding to the image attribute information.

A travel service information display method according to the present invention includes an image attribute information obtaining step of obtaining image attribute information on each of a plurality of images relevant to a travel service; a review information obtaining step of obtaining review information inputted by a user of the travel service; an evaluation step of making evaluation of the travel service with respect to a predetermined evaluation item based on the review information; and a display manner control step of controlling a display manner for the plurality of images based on the image attribute information and a result of the evaluation with respect to the evaluation item corresponding to the image attribute information.

A travel service information display program according to the present invention is a program for causing a computer to function as image attribute information obtaining means for obtaining image attribute information on each of a plurality of images relevant to a travel service; review information obtaining means for obtaining review information inputted by a user of the travel service; evaluation means for making evaluation of the travel service with respect to a predetermined evaluation item based on the review information; and display manner control means for controlling a display manner for the plurality of images based on the image attribute information and a result of the evaluation with respect to the evaluation item corresponding to the image attribute information.

An information recording medium according to the present invention is an information recording medium recording a travel service information display program for causing a computer to function as image attribute information obtaining means for obtaining image attribute information on each of a plurality of images relevant to a travel service; review information obtaining means for obtaining review information inputted by a user of the travel service; evaluation means for making evaluation of the travel service with respect to a predetermined evaluation item based on the review information; and display manner control means for controlling a display manner for the plurality of images based on the image attribute information and a result of the evaluation with respect to the evaluation item corresponding to the image attribute information.

According to the present invention, a travel service information display system, a travel service information display method, a travel service information display program, and an information recording medium are provided that control a display manner of an image in displaying travel service information in consideration of subjective evaluation by a user having used the service.

DESCRIPTION OF EMBODIMENTS

In the following, one embodiment of the present invention will be described in detail, based on the drawings.

Figure 1:
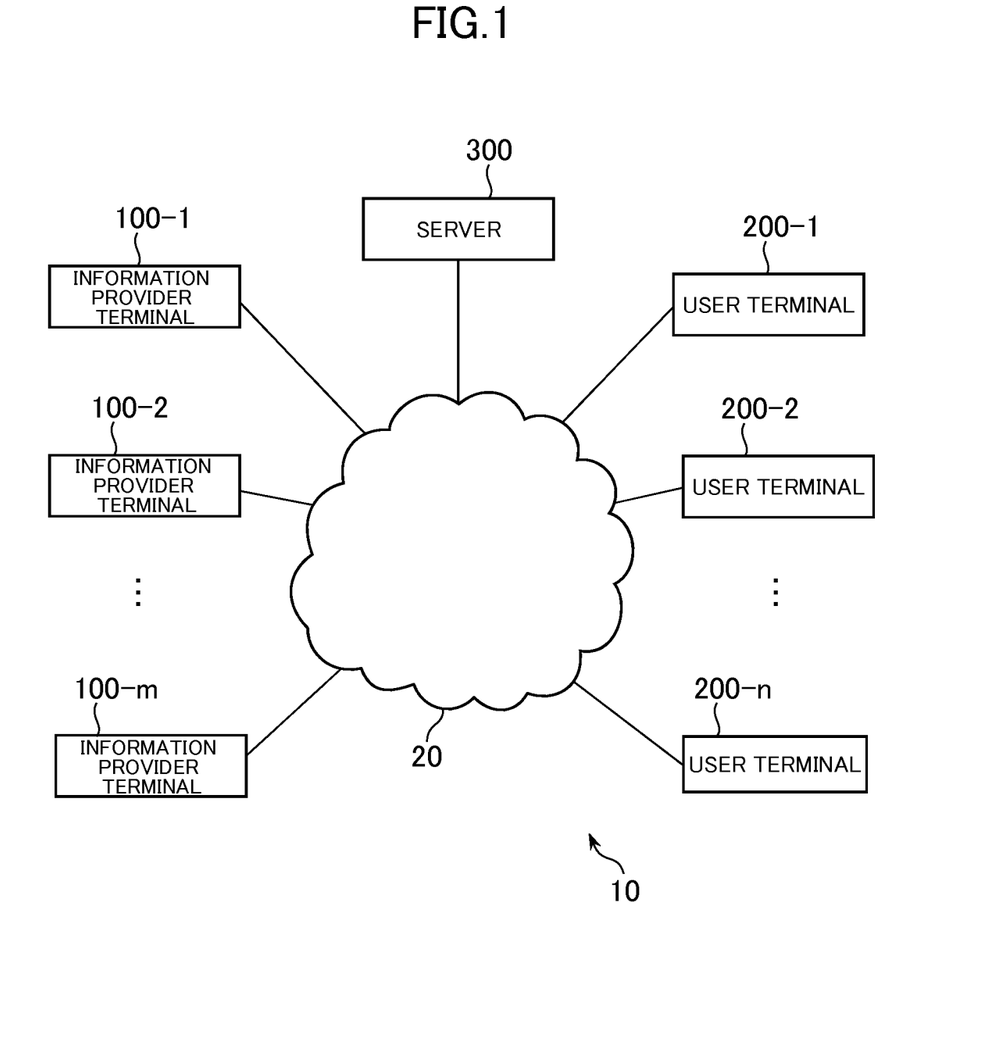
FIG. 1 shows a complete structure of a travel service information display system according to one embodiment of the present invention.

FIG. 1 shows a complete structure of a travel service information display system 10 according to one embodiment of the present invention. As shown in FIG. 1, the travel service information display system 10 includes an information provider terminal 100 (100-1 to 100-$m$), a user terminal 200 (200-1 to 200-$n$), and a server 300, all connected to one another via a network 20, such as the Internet, or the like. The information provider terminal 100 and the user terminal 200 are each an information processing device, such as a personal computer, a portable communication terminal, or the like, having a display unit, such as a display or the like. The server 300 is an information processing device, such as, a personal computer, or the like.

The information provider terminal 100 sends travel service information containing image data to the server 300, and the server 30 accumulates the travel service information received. Meanwhile, the user terminal 200 requests the server 300 for travel service information, and the server 300 provides the travel service information to the user terminal 200 in response to the request (to be described later).

The server 300 then receives an application for use of the travel service from the user terminal 200. Then, the server 300 accumulates the content of the application, and also sends the content of the application to a concerned information provider terminal 100. After use of the travel service by the user, the server 300 receives review information inputted by the user from the user terminal 200, and accumulates the review information.

Figure 2:
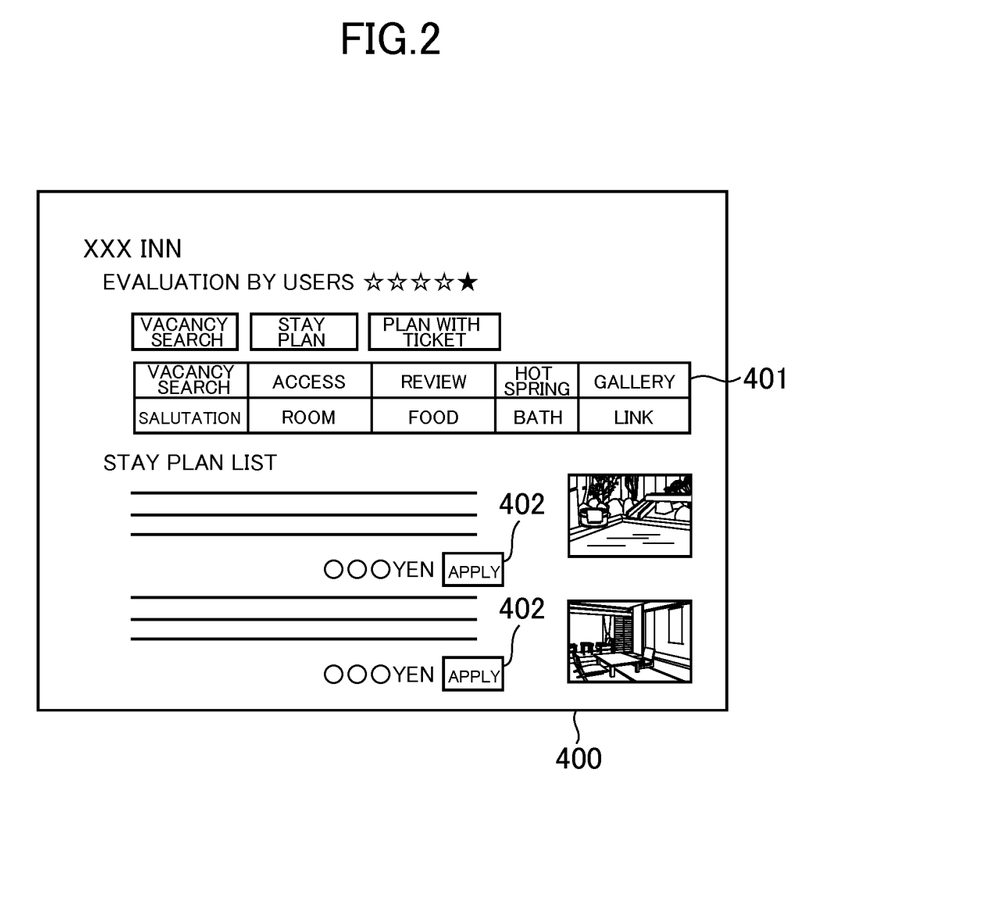
FIG. 2 shows one example of a content display screen image displayed on a display unit of a user terminal.
Figure 3:
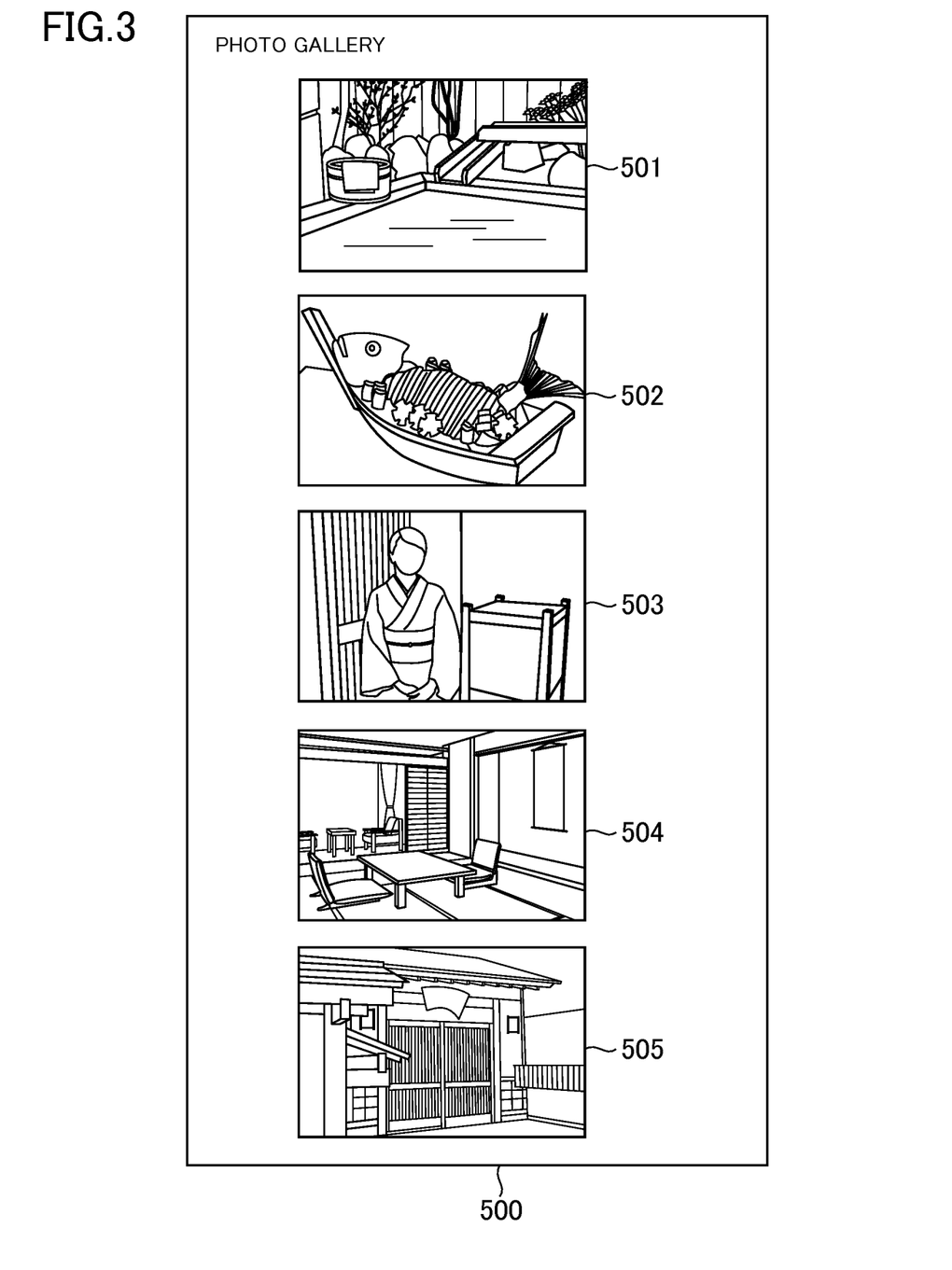
FIG. 3 shows one example of a gallery display screen image displayed on the display unit of the user terminal.

In provision of the travel service information, the server 300, in response to a request from the user terminal 200, sends content display information for displaying in the user terminal 200 a content display screen image 400 showing content of the travel service, and gallery display information for displaying in the user terminal 200 gallery display screen image 500 including a plurality of images arranged relevant to the travel service. Then, the user terminal 200 displays the content display screen image 400 and the gallery display screen image 500 on a display unit 210 (not shown) thereof. FIG. 2 shows one example of the content display screen image 400 displayed on the display unit 210 of the user terminal 200. FIG. 3 shows one example of the gallery display screen image 500 displayed on the display unit 210 of the user terminal 200.

In the gallery display screen image 500, images are sequentially shown, beginning with an image relevant to an attribute, such as "food", "hot spring", or the like, that is frequently referred to (that is, highly interested in by a user) in review information inputted in the past by a user of the travel service. That is, an image showing content of a travel service is displayed in a display manner in consideration of subjective evaluation by a user having used the travel service.

Below, an operation of each device of the travel service information display system 10 will be described. Initially, the information provider terminal 100 will be described.

The information provider terminal 100 is a terminal for use by a provider who provides a travel service (an information provider who provides travel service information), such as, for example, a manager of an accommodation facility or the like, and sends travel service information describing the content of the travel service to the server 300.

Figure 4:
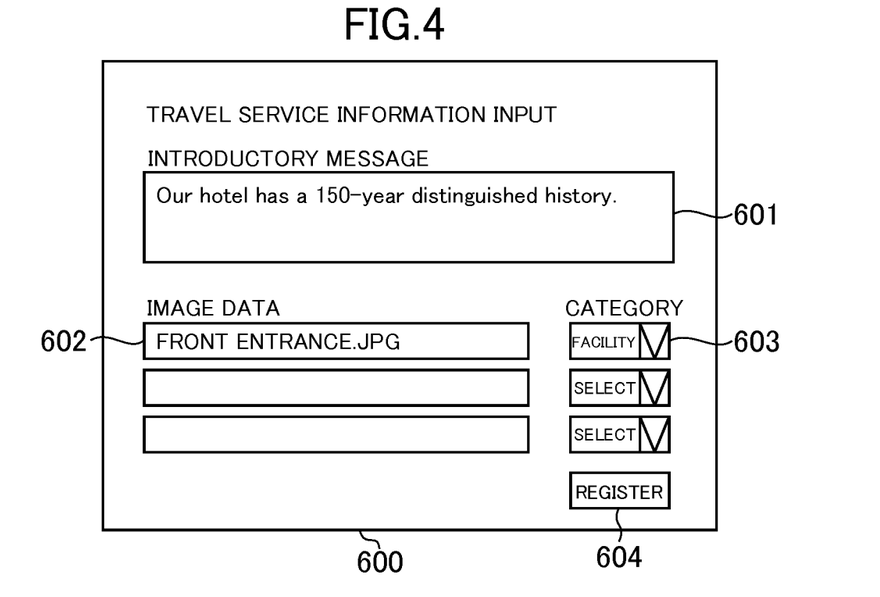
FIG. 4 shows one example of a travel service information input screen image displayed on a display unit of an information provider terminal.

The information provider terminal 100 initially displays a travel service information input screen image on a display unit 110 thereof. FIG. 4 shows one example of the travel service information input screen image 600 displayed on the display unit 110 of the information provider terminal 100. An information provider, while operating the information provider terminal 100, inputs an introductory message of a travel service in an introductory message input space 601 and image data for registration in an image data input space 602, and then presses a register key 604. In this operation, the information provider selects an attribute (category) of an image in a category selection menu 603, with respect to each of image data.

The information provider terminal 100 sends travel service information including the inputted travel service introductory message, image data, and image attribute information indicating the attribution of each image data to the server 300. The travel service information sent is accumulated in the server 300.

Next, the user terminal 200 will be described. The user terminal 200 is a terminal for use by a user of a travel service. To apply for use of a travel service, the user terminal 200 displays a screen image that shows the travel service information received from the server 300 on the display unit 210 thereof, to thereby provide the information to the user, and then receives an application for use of the travel service. Meanwhile, to input review information that is a comment on a travel service, the user terminal 200 sends review information inputted by a user to the server 300.

Figure 5:
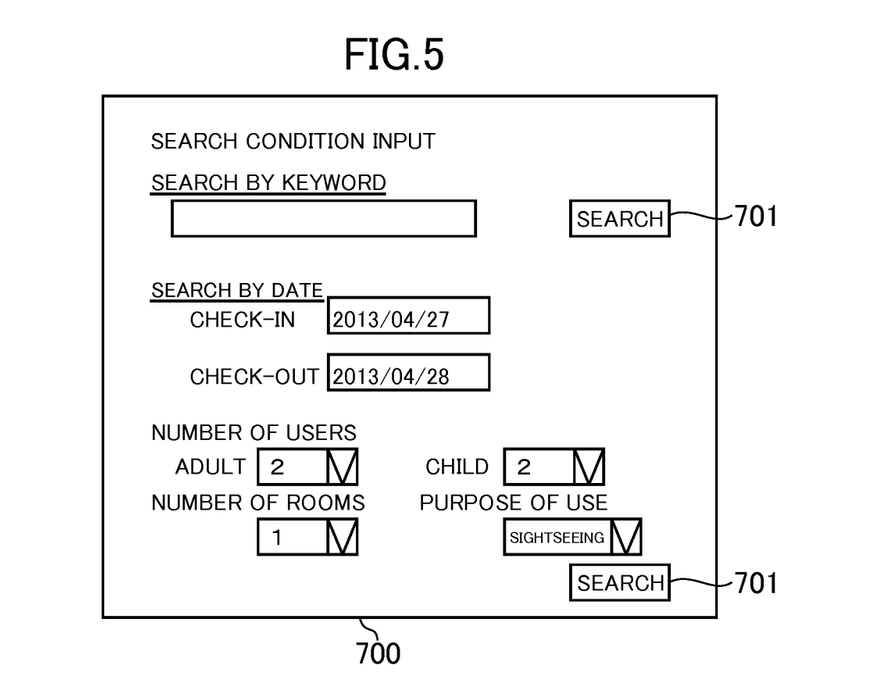
FIG. 5 shows one example of a search condition input screen image displayed on the display unit of the user terminal.

Initially, an operation of the user terminal 200 that is executed in applying for use of a travel service will be described. That is, the user terminal 200 initially displays a search condition input screen image 700 on the display unit 210 thereof. FIG. 5 shows one example of the search condition input screen image 700 displayed on the display unit 210 of the user terminal 200. Then, a user, while operating the user terminal 200, inputs a search keyword, a planned date of use, a number of people, a purpose of use, or the like, and then presses a search key 701.

Figure 6:
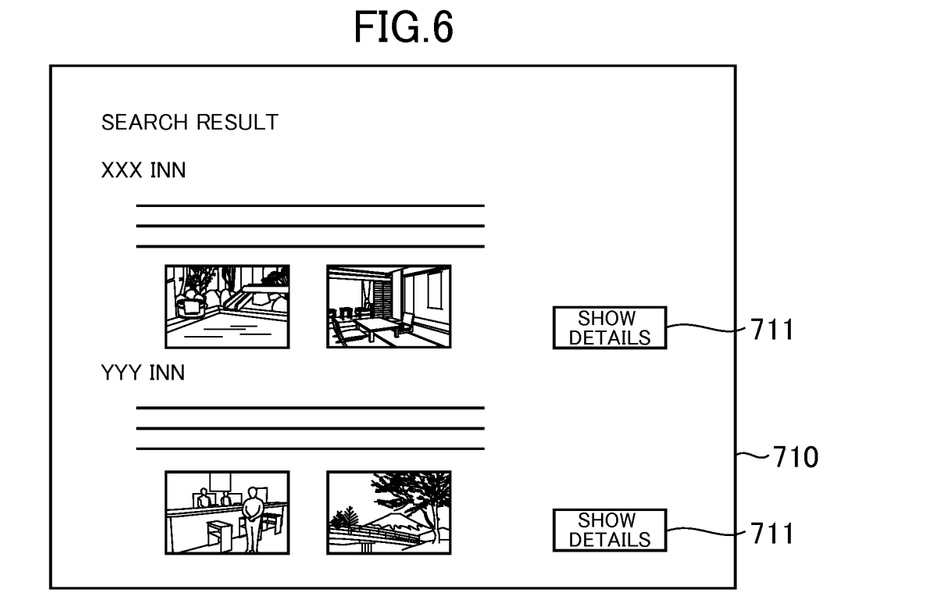
FIG. 6 shows one example of a search result screen image displayed on the display unit of the user terminal.

In response to the search key 701 pressed, the user terminal 200 sends search condition information indicating the inputted keyword, planned date of use, number of people, purpose of use, or the like, to the server 300. Thereupon, the server 300 executes a search with respect to the travel service information received from the information provider terminal 100 and accumulated therein, and sends search result information indicating a search result to the user terminal 200. Upon receipt of the search result information, the user terminal 200 displays a search result screen image 710 based on the search result information on the display unit 210. FIG. 6 shows one example of the search result screen image 710 displayed on the display unit 210 of the user terminal 200. Then, a user presses a show details key 711 of a travel service in which the user is interested, upon which the user terminal 200 receives content display information of the travel service from the server 300, and displays a content display screen image 400 (see FIG. 2) on the display unit 210. Thereafter, the user presses a gallery key 401 in the content display screen image 400, upon which the user terminal 200 receives the gallery display information from the server 300, and displays a gallery display screen image 500 (see FIG. 3) on the display unit 210.

Figure 7:
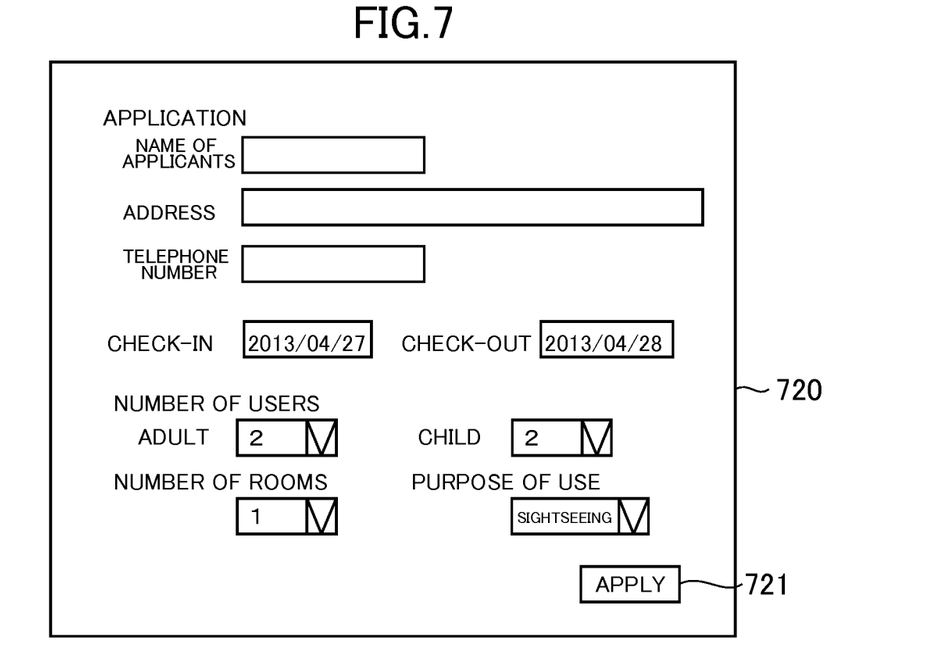
FIG. 7 shows one example of an application screen image displayed on the display unit of the user terminal.

With reference to the content display screen image 400 and the gallery display screen image 500, the user of the user terminal 200 decides a travel service to use, and then presses an apply key 402 in the content display screen image 400. In response to the apply key 402 pressed, the user terminal 200 displays an application screen image 720 on the display unit 210. FIG. 7 shows one example of the application screen image 720 displayed on the display unit 210 of the user terminal 200. Then, the user inputs a date of use, the number of users, a purpose of use, and the like, in the application screen image 720, and then presses an apply key 721, upon which the user terminal 200 sends the information inputted (application information) to the server 300. With the above, application processing executed in the user terminal 200 is finished. Note that the information sent is further sent from the server 300 to an information provider terminal 100 relevant to the travel service information to which the application is made. Further, information indicating the date of use and information indicating a manner of use, such as the number of users, a purpose of use, and the like, contained in the application information are accumulated in a use history information accumulation unit 390 of the server 300, to be described later, as actual use date information and actual use manner information, respectively.

Figure 8:
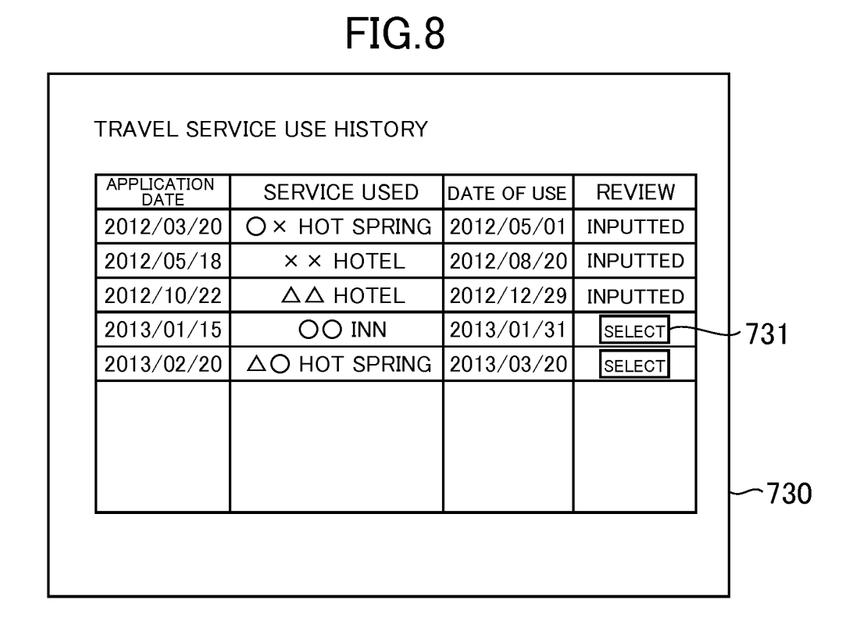
FIG. 8 shows one example of a travel service use history screen image displayed on the display unit of the user terminal.

Next, an operation of the user terminal 200 that is executed in inputting review information will be described. That is, the user terminal 200, in response to a user operation, displays a travel service use history screen image 730 showing a travel service used by the user on the display unit 210. FIG. 8 shows one example of the travel service use history screen image 730 displayed on the display unit 210 of the user terminal 200. The use history of travel services shown here is accumulated in the server 300, and received from the server 300 to be displayed. Then, the user, while operating the user terminal 200, presses a select key 731 of a travel service with respect to which the user is inputting a review.

Figure 9:
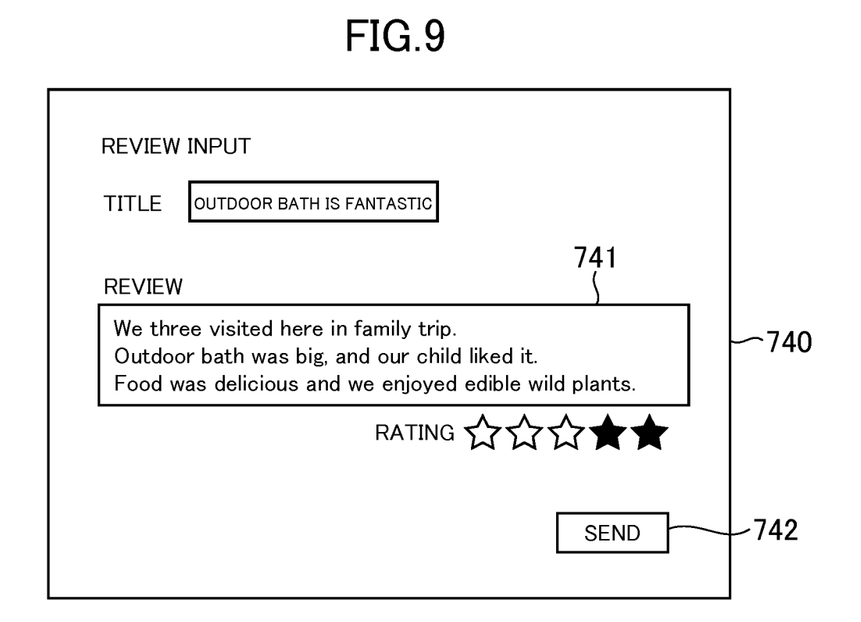
FIG. 9 shows one example of a review input screen image displayed on the display unit of the user terminal.

Thereafter, the user terminal 200 displays a review input screen image 740 for the selected travel service on the display unit 210. FIG. 9 shows one example of the review input screen image 740 displayed on the display unit 210 of the user terminal 200. Then, the user, while operating the user terminal 200, inputs a review in a review input space 741, and then presses a send key 742.

In response to the send key 742 pressed, the user terminal 200 sends review information describing the content of the review inputted in the review input screen image 740 to the server 300. With the above, processing that is executed in inputting a review in the user terminal 200 is finished. Note that the review information sent is accumulated in the server 300.

Next, the server 300 will be described. The server 300 accumulates the travel service information received from the information provider terminal 100 and the review information received from the user terminal 200.

Further, the server 300 generates the content display information based on the travel service information, and the gallery display information based on the travel service information and the review information, respectively.

Further, the server 300 executes search processing with respect to the travel service information, based on the search condition information received from the user terminal 200, and sends search result information indicating a result thereof to the user terminal 200. Still further, the server 300 sends the content display information and the gallery display information in response to a request from the user terminal 200.

Yet further, the server 300 sends the application information received from the user terminal 200 to the information provider terminal 100, and also accumulates the application information as use history information indicating history of use.

Figure 10:
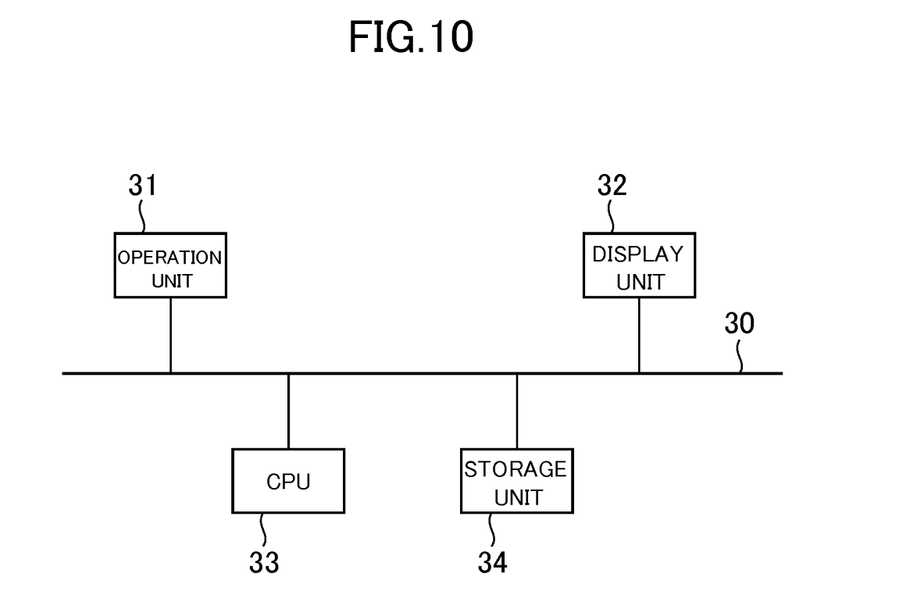
FIG. 10 is a block diagram showing a hardware structure of a server according to one embodiment of the present invention.

Below, a structure of the server 300 is described. FIG. 10 is a block diagram showing a hardware structure of the server 300 according to one embodiment of the present invention. The server 300 includes an operation unit 31, a display unit 32, a CPU 33, and a storage unit 34, all connected to one another via a bus 30. The operation unit 31 includes a keyboard, a mouse, or the like, and receives an operation by an administrator of the travel service information display system 10. The display unit 32 includes a display device, such as a liquid crystal display, or the like. The CPU 33 operates according to a program stored in the storage unit 34, and implements respective functions to be described below. The storage unit 34 includes a hard disk, a memory, or the like.

Figure 11:
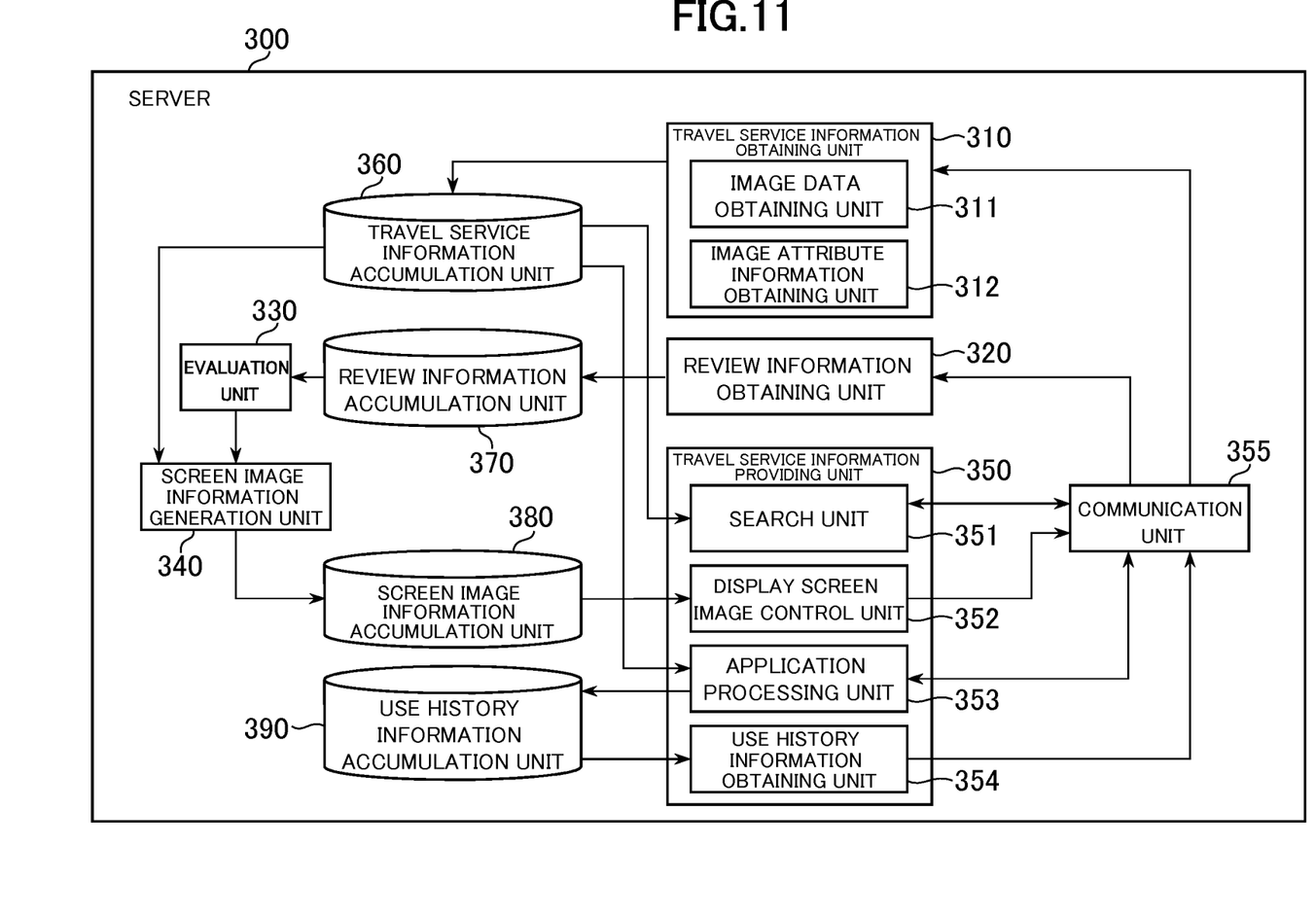
FIG. 11 is a functional block diagram showing a function of a server according to one embodiment of the present invention.

FIG. 11 is a functional block diagram showing a function of the server 300 according to one embodiment of the present invention. The server 300 includes a travel service information obtaining unit 310, a review information obtaining unit 320, an evaluation unit 330, a screen image information generation unit 340, a travel service information providing unit 350, a communication unit 355, a travel service information accumulation unit 360, a review information accumulation unit 370, a screen image information accumulation unit 380, and a use history information accumulation unit 390. The travel service information obtaining unit 310, the review information obtaining unit 320, the evaluation unit 330, the screen image information generation unit 340, the travel service information providing unit 350, and the communication unit 355 are implemented as functions of the CPU 33, which operates as respective code (image attribute information obtaining code, review information obtaining code, evaluation code, display manner control code, and sending code) configured to cause the CPU 33 to perform corresponding operations, the program code being included in a program stored in the storage unit 34. The travel service information accumulation unit 360, the review information accumulation unit 370, the screen image information accumulation unit 380, and the use history information accumulation unit 390 are implemented using a hard disk, or the like, that constitutes the storage unit 34.

The travel service information obtaining unit 310 obtains the travel service information received from the information provider terminal 100, and outputs the travel service information to the travel service information accumulation unit 360. The travel service information obtaining unit 310 includes an image data obtaining unit 311 and an image attribute information obtaining unit 312. The image data obtaining unit 311 obtains the image data inputted in the image data input space 602 shown in FIG. 4, from the travel service information, and outputs the obtained image data to the travel service information accumulation unit 360. The image attribute information obtaining unit 312 obtains the image attribute information indicating the category selected in the category selection menu 603 shown in FIG. 4, from the travel service information, and outputs the obtained image attribute information to the travel service information accumulation unit 360.

Figure 12:
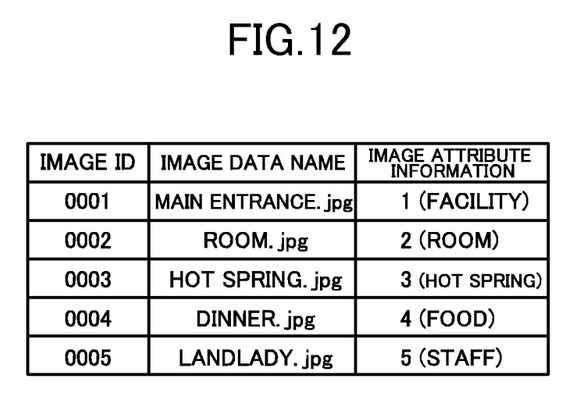
FIG. 12 shows one example of image data and image attribute information accumulated in a travel service information accumulation unit.

The travel service information accumulation unit 360 accumulates the travel service information inputted from the travel service information obtaining unit 310. In this operation, the travel service information accumulation unit 360 stores the image data inputted from the image data obtaining unit 311 and the image attribute information inputted from the image attribute information obtaining unit 312 so as to be correlated to each other. FIG. 12 shows one example of the image data and the image attribute information accumulated in the travel service information accumulation unit 360.

The review information obtaining unit 320 obtains the review information received from the user terminal 200, and outputs to the review information accumulation unit 370. In this operation, the review information is stored so as to be correlated to the actual use date information indicating the date of use of the travel service relevant to the review information and the actual use manner information indicating the manner of use, such as the number of users, a purpose of use, and the like, of the same. These information items, which are stored to be accumulated in the use history information accumulation unit 390 when an application for use of the travel service is made, are received from the use history information accumulation unit 390 when review information is inputted in or received from the user terminal 200, and accumulated in the review information accumulation unit 370 so as to be correlated to the review information.

The evaluation unit 330 executes evaluation processing with respect to a predetermined evaluation item of the travel service information, based on the review information accumulated in the review information accumulation unit 370. Below, the evaluation processing will be described in detail.

That is, the evaluation unit 330 executes evaluation processing with respect to a predetermined evaluation item of the travel service information at a predetermined time on $1^{st}$ of every month, for example. Initially, the evaluation unit 330 obtains review information correlated to the use history information for the month in the past same as the month when analysis is made (that is, for analysis conducted in April 2013, April in each year prior to 2013), and classifies the review information obtained according to a manner of use, based on the correlated actual use manner information.

Figure 13:
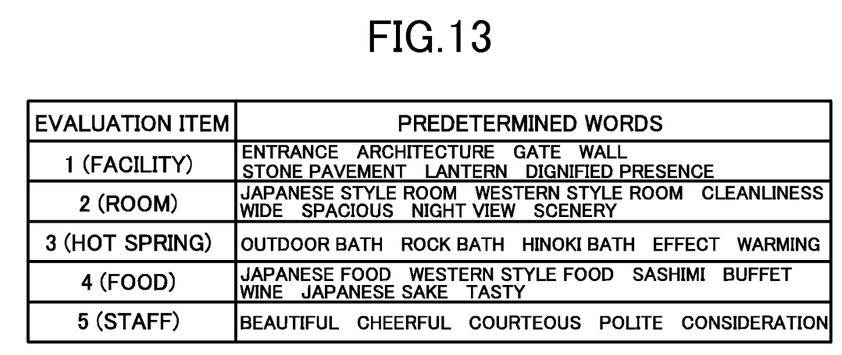
FIG. 13 shows one example of a predetermined word correlated to an evaluation item.

The evaluation unit 330 executes analysis processing with respect to each of the review information classified. Specifically, the evaluation unit 330 breaks down a review message into units of word through morphological analysis, or the like, and counts the number of occurrences of a predetermined word (keyword) in the review message. The predetermined word here refers to a word relevant to each evaluation item of a travel service, and is set in advance so as to be correlated to the evaluation item. FIG. 13 shows an example of a predetermined word correlated to the evaluation item. These evaluation items correspond to respective image attribute information defined for an image (see FIG. 12).

Figure 14:
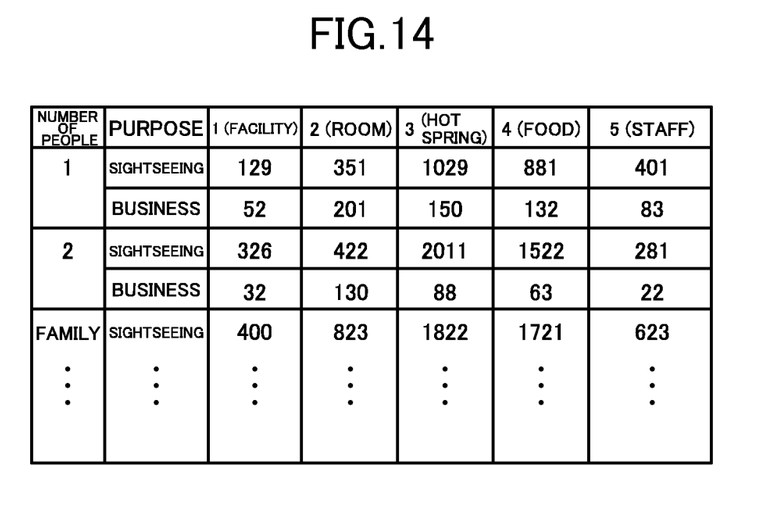
FIG. 14 shows one example of a result of evaluation made by an evaluation unit.

Then, the evaluation unit 330 calculates the sum of the numbers of occurrences of a predetermined word correlated to each evaluation item in review messages of all reviews classified for every manner of use (actual use manner information). FIG. 14 shows one example of a result of evaluation made by the evaluation unit 330. Evaluation information indicating the result of evaluation is output to the screen image information generation unit 340. With the above, the evaluation processing by the evaluation unit 330 is finished.

Next, the screen image information generation unit 340 will be described. The screen image information generation unit 340 generates the content display information, based on the travel service information accumulated in the travel service information accumulation unit 360. Further, the screen image information generation unit 340 generates the gallery display information, based on the image data contained in the travel service information accumulated in the travel service information accumulation unit 360 and the evaluation information inputted from the evaluation unit 330. The content display information and the gallery display information are each a data file in html format or the like for displaying the content display screen image 400 (see FIG. 2) and the gallery display screen image 500 (see FIG. 3), respectively, on the display unit 210 of the user terminal 200.

For example, when the travel service information obtaining unit 310 obtains travel service information, the screen image information generation unit 340 generates the content display information, based on the travel service information obtained. The format of the content display screen image 400 (that is, the format of a data file for displaying the content display screen image 400) is set in advance, and each information item contained in the travel service information is fit into the format, whereby the content display information is generated. The generated content display information is accumulated in the screen image information accumulation unit 380.

Further, the screen image information generation unit 340 generates the gallery display information, based on the evaluation information and the image data contained in the travel service information. In this operation, the screen image information generation unit 340 generates the gallery display information such that images are sequentially shown, beginning with an image correlated to an image attribute information corresponding to a evaluation item with a larger value gained (with a larger number of occurrences of a predetermined word in review messages) in the evaluation information. In this embodiment, an evaluation item corresponds to an image attribute information, and in the result of evaluation shown in FIG. 14, in a case of one person and sightseeing purpose, higher evaluation are obtained with respect to the respective attribute information items 3, 4, 5, 2, and 1 in this order. Therefore, when displaying the image data shown in FIG. 12, data file for displaying "hot spring.jpg" corresponding to the attribute 3, "dinner.jpg" corresponding to the attribute 4, "landlady.jpg" corresponding to the attribute 5, "room.jpg" corresponding to the attribute 2 and "entrance.jpg" corresponding to the attribute 1, as the images 501, 502, 503, 504, and 505, respectively in FIG. 3 is generated.

The screen image information generation unit 340 generates the gallery display information with respect to each actual use manner information item once in a month, for example, when the evaluation unit 330 generates analysis result information. The generated data file is accumulated in the screen image information accumulation unit 380. Gallery display information with respect to each actual use manner information for twelve months (twelve items) are always kept accumulated in the screen image information accumulation unit 380, and, when gallery display information for a month is newly generated, the generated gallery display information is written over the gallery display information for the month same as the month of the newly generated galley display information.

Based on the travel service information accumulated in the travel service information accumulation unit 360, the travel service information providing unit 350 conducts sending of information for a travel service, receiving of an application for use of a travel service, and sending of use history information on a travel service when inputting review information, with respect to the user terminal 200.

The travel service information providing unit 350 includes a search unit 351, a display screen image control unit 352, an application processing unit 353, and a use history information obtaining unit 354. The search unit 351 executes search processing with respect to the travel service information accumulated in the travel service information accumulation unit 360, based on the search condition information received from the user terminal 200, and sends search result information indicating a result of the search processing (travel service in accordance with the search condition) to the user terminal 200.

In response to a signal received from the user terminal 200, the display screen image control unit 352 obtains the content display information for displaying the content display screen image 400 (see FIG. 2) and the galley display information for displaying the gallery display screen image 500 (see FIG. 3) from the screen image information accumulation unit 380, and sends the content display information and the galley display information to the user terminal 200. In this operation, the display screen image control unit 352 sends gallery display information in accordance with the planned use date information and the planned use manner information received from the user terminal 200. That is, in a case where "May" and "two people" and "sightseeing" are inputted for search by a user as the planned use date information and the planned use manner information, respectively, the display screen image control unit 352 obtains galley display information generated based on review information with use date history information "May" and use manner history information "two people" and "sightseeing", and sends the galley display information to the user terminal 200 via the communication unit 355.

With the above, the gallery display screen image 500 that reflects the review information inputted by a user having used the service at a date and in a manner of use same as the date and manner of use planned by a concerned user is displayed on the display unit 210 of the user terminal 200.

That is, in response to the planned use date information inputted, the display screen image control unit 352 controls the manner of display of the images in the gallery display screen image 500 displayed on the display unit 210 of the user terminal 200, based on an evaluation result made by the evaluation unit 330, based on the review information selected based on the planned use date information and the actual use date information.

Further, in response to planned use manner information inputted, the display screen image control unit 352 controls the manner of display of the images in the gallery display screen image 500 displayed on the display unit 210 of the user terminal 200, based on an evaluation result made by the evaluation unit 330, based on the review information selected based on the planned use manner information and the actual use manner information.

The application processing unit 353 receives an application for a travel service, based on a signal received from the user terminal 200. Specifically, the application processing unit 353 obtains information (application information) indicating personal information of a user and information for a travel service to use (date, number of people, or the like) inputted in the user terminal 200. Then, the application processing unit 353 sends the obtained application information to the information provider terminal 100 of an information provider who provides the travel service, and also outputs the obtained application information to the use history information accumulation unit 390. The use history information accumulation unit 390 accumulates the application information inputted as the use history information. In this operation, the use history information accumulation unit 390 accumulates the use date and the use manner in the application information as the actual use date information and the actual use manner information, respectively.

When a user of the user terminal 200 refers to travel service use history for themselves when, for example, inputting review information or the like, the use history information obtaining unit 354 obtains the use history information from the use history information accumulation unit 390, and sends the use history information to the user terminal 200 via the communication unit 355.

The communication unit 355 executes sending processing for sending to the network 20, with respect to data outputted from the above described respective units in the server 300 to be sent to another device, and executes receiving processing for receiving from the network 20, with respect to data sent from another device to be inputted to the respective units in the server 300.

Figure 15:
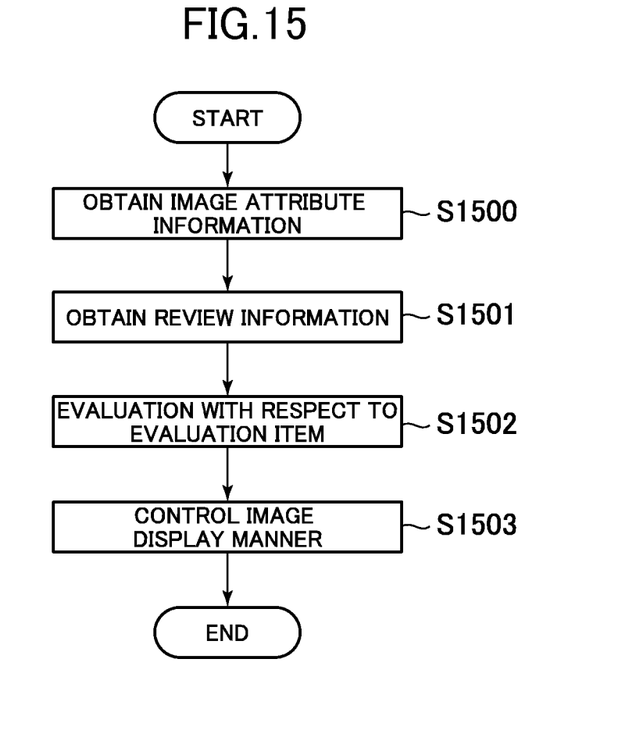
FIG. 15 is a flowchart showing travel service information display processing executed in the travel service information display system according to one embodiment of the present invention.

Next, a travel service information display method executed in the travel service information display system 10 according to the present invention will be described, referring to a flowchart. FIG. 15 is a flowchart showing travel service information display processing that is executed in the travel service information display system 10 according to one embodiment of the present invention.

Initially, the travel service information obtaining unit 310 of the server 300 obtains travel service information inputted in the information provider terminal 100. In this operation, the image attribute information obtaining unit 312 obtains image attribute information (S1500).

Then, the review information obtaining unit 320 of the server 300 obtains review information inputted in the user terminal 200 (S1501).

Then, the evaluation unit 330 of the server 300 makes evaluation for the travel service information inputted at S1500 as to a predetermined evaluation item, based on the review information obtained at S1501 (S1502).

Then, the display screen image control unit 352 of the server 300 controls the manner of display of the images in the gallery display screen image 500 displayed on the display unit 210 of the user terminal 200, based on the image attribute information obtained at S1500 and a result of evaluation made at S1402 (S1503).

With the above described structure, there is provided a travel service information display system 10 that decides a manner of display of the images in the gallery display screen image 500 displayed on the display unit 210 of the user terminal 200 in consideration of subjective evaluation by a user having used the travel service.

Note that, although a structure for controlling the order of display of the images, based on the evaluation, is described in the above described embodiment, the present invention is not limited to this structure, and a structure for controlling a display size of an image, whether or not to display an image, and so forth, may be applicable. Further, a structure for allowing registration of two or more images with respect to the same image attribute information and controlling the number of images to be displayed, based on the evaluation, may be also applicable. In a structure for controlling a display size, a larger image is displayed with respect to an evaluation item with a larger number of occurrences of a predetermined word (hereinafter referred to as "an evaluation item with a higher evaluation"). In a structure for controlling whether or not to display an image, an image corresponding to an evaluation item with a higher evaluation is displayed with priority. In a structure for controlling the number of images to be displayed, a larger number of images are displayed with respect to an evaluation item with a higher evaluation.

Further, although a structure for controlling a manner of display of the images in the gallery display screen image 500, based on the evaluation, is described in the above described embodiment, the present invention is not limited to this structure, and a structure for controlling a manner of display of the image in the content display screen image 400 or the search result screen image 710 may be applicable.

Further, although a structure for obtaining the image attribute information from the selection content in the category selection menu 603 is described in the above described embodiment, the present invention is not limited to this structure, and a structure for arbitrarily inputting image attribute information or determining by analyzing information, such as, an image data name, or the like, pertaining to the image data, may be applicable.

Further, in analysis of a review by the evaluation unit 330, although a structure for counting the number of occurrences of a predetermined word, based on morphological analysis is described in the above, the present invention is not limited to this structure, and a structure for determining, after breaking down a review message, whether or not the review is relevant to a predetermined travel service attribute information, using a synonymous dictionary, such as a thesaurus, or the like, may be applicable. Further, a structure in which, as a menu for selecting one option with good impression, a plurality of selection options each corresponding to each evaluation item is displayed and selection is received, so that an evaluation result with respect to the evaluation item can be more readily obtained may be applicable.

Further, although a structure in which one image attribute information item corresponds to one evaluation item is described in the above described embodiment, one may correspond to two or more, or two or more may correspond to one.

The predetermined word shown in FIG. 13 may be changed depending on a time or season when the gallery display information is generated (the actual use date information correlated to the review information used). For example, words such as "heating", "warm" may be used in winter, while "cooling", "well cooled", "cool" or the like may be used in summer.

Further, although the travel service information display system 10 for displaying information on an accommodation facility as travel service information is described in the above described embodiment, the present invention is not limited to this structure, and can be applied to a travel service information display system for displaying information on a package travel, a sightseeing spot, an event, or the like.

The information provider terminal 100, the user terminal 200, and the server 300 according to the present invention are each an information processing device, and the respective functions described above are implemented by operating a program stored in each of the information processing devices. This program may be provided as being stored in an information storage medium that is readable for an information processing device, or via communication.

BRIEF DESCRIPTION ON REFERENCE NUMERALS 10 travel service information display system, 20 network, 30 bus, 31 operation unit, 32 display unit, 33 CPU, 34 storage unit, 100 information provider terminal, 110 display unit, 200 user terminal, 210 display unit, 300 server, 310 travel service information obtaining unit, 311 image data obtaining unit, 312 image attribute information obtaining unit, 320 review information obtaining unit, 330 evaluation unit, 340 screen image information generation unit, 350 travel service information providing unit, 351 search unit, 352 display screen image control unit, 353 application processing unit, 354 use history information obtaining unit, 355 communication unit, 360 travel service information accumulation unit, 370 review information accumulation unit, 380 screen image information accumulation unit, 390 use history information accumulation unit, 400 content display screen image, 401 gallery key, 402 apply key, 500 gallery display screen image, 501, 502, 503, 504, 505 image, 600 travel service information input screen image, 601 introductory message input space, 602 image data input space, 603 category selection menu, 604 register key, 700 search condition input screen image, 701 search key, 710 search result screen image, 711 show details key, 720 application screen image, 721 apply key, 730 travel service use history screen image, 731 select key, 740 review input screen image, 741 review input space, 742 send key.

The invention claimed is:

1. A travel service information display system, comprising:
  at least one memory configured to store program code; and
  at least one processor configured to access said at least one memory, read the program code and operate as instructed by the program code, the program code including:
    image attribute information obtaining code configured to cause at least one of said at least one processor to, in response to a user of a terminal selecting one of a plurality of travel services, the plurality of travel services being displayed on a display screen and requested by the user of the terminal, obtain image attribute information for each of a plurality of images relevant to a first travel service selected by the user from among the plurality of travel services, the image attribute information indicating an evaluation item of a user selected travel service;

review information obtaining code configured to cause at least one of said at least one processor to obtain review information including one or more review messages submitted by the user with respect to one or more evaluation items of at least one second travel service from among the displayed plurality of travel services the review information being accumulated and stored in a storage;

evaluation code configured to cause at least one of said at least one processor to execute evaluation processing on the review information accumulated and stored in the storage, with respect to each of the one or more evaluation items, by counting a sum of a number of occurrences of one or more predetermined words in the one or more review messages submitted by the user, the one or more predetermined words being included in a list of words that are set, in advance of execution of the evaluation processing, as correlated to each of the one or more evaluation items;

display manner control code configured to cause at least one of said at least one processor to determine an order of one or more of the plurality of images displayed on the display screen of the terminal, the order being determined so that an image of the user selected first travel service of which image attribute information indicates an evaluation item having a higher sum of the number of occurrences of one or more predetermined words correlated thereto in the one or more review messages has a higher display order and an image of the user selected first travel service of which image attribute information indicates an evaluation item having a lower sum of the number of occurrences of one or more predetermined words correlated thereto in the one or more review messages has a lower display order; and sending code configured to cause at least one of said at least one processor to send the plurality of images to the terminal so that the plurality of images are displayed at the terminal in the order determined by the display manner control code.

2. The travel service information display system according to claim 1, wherein the program code further comprises:

planned use date information obtaining code configured to cause at least one of said at least one processor to obtain a planned use date information indicating a planned date of use of the user selected travel service, wherein the review information is correlated to an actual use date information indicating a date in which the user selected travel service is used, and wherein the number of evaluations is based on the review information selected based on the planned use date information and the actual use date information.

3. The travel service information display system according to claim 1, wherein the program code further comprises:

planned use manner information obtaining code configured to cause at least one of said at least one processor to obtain a planned use manner information indicating a planned manner of use of the user selected travel service, wherein the review information is correlated to an actual use manner information indicating a manner of use of the user selected travel service, and wherein the number of evaluations is based on the review information selected based on the planned use manner information and the actual use manner information.

4. The travel service information display system according to claim 1, wherein the display manner control code is further configured to cause at least one of said at least one processor to control a display size of each of the plurality of images.

5. The travel service information display system according to claim 1, wherein the display manner control code is further configured to cause at least one of said at least one processor to determine whether to execute or restrict display of each of the plurality of images.

6. A travel service information display method, comprising:

in response to a user of a terminal selecting one of a plurality of travel services, the plurality of travel services being displayed on a display screen and requested by the user of the terminal, obtaining image attribute information for each of a plurality of images relevant to a first travel service selected by the user from among the plurality of travel services, the image attribute information indicating an evaluation item of a user selected travel service;

obtaining review information including one or more review messages submitted by the user with respect to one or more evaluation items of at least one second travel service from among the displayed plurality of travel services, the review information being accumulated and stored in a storage;

executing evaluation processing on the review information accumulated and stored in the storage, with respect to each of the one or more evaluation items, by counting a number of occurrences of one or more predetermined words in the one or more review messages submitted by the user, the one or more predetermined words being included in a list of words that are set, in advance of execution of the evaluation processing, as correlated to each of the one or more evaluation items;

determining an order of one or more of the plurality of images displayed on the display screen of the terminal, the order being determined so that an image of the user selected first travel service of which image attribute information indicates an evaluation item having a higher counted number of one or more predetermined words correlated thereto in the one or more review messages has a higher display order and an image of the user selected first travel service of which image attribute information indicates an evaluation item having a lower counted number of one or more predetermined words correlated thereto in the one or more review messages has a lower display order; and sending the plurality of images to the terminal so that the plurality of images are displayed at the terminal in the order determined.

7. A non-transitory computer-readable storage medium having stored thereon a travel service information display program which, when executed by a computer, causes the computer to:

in response to a user of a terminal selecting one of a plurality of travel services, the plurality of travel services being displayed on a display screen and requested by the user of the terminal, obtain image attribute information for each of a plurality of images relevant to a first travel service selected by the user from among the plurality of travel services, the image attribute information indicating an evaluation item of a user selected travel service;

obtain review information including one or more review messages submitted by the user with respect to one or more evaluation items of at least one second travel service from among the displayed plurality of travel services, the review information being accumulated and stored in a storage;

execute evaluation processing on the review information accumulated and stored in the storage, with respect to each of the one or more evaluation items, by counting a number of occurrences of one or more predetermined words in the one or more review messages submitted by the user, the one or more predetermined words being included in a list of words that are set, in advance of execution of the evaluation processing, as correlated to each of the one or more evaluation items;

determine an order of one or more of the plurality of images displayed on the display screen of the terminal, the order being determined so that an image of the user selected first travel service of which image attribute information indicates an evaluation item having a higher counted number of one or more predetermined words correlated thereto in the one or more review messages has a higher display order and an image of the user selected first travel service of which image attribute information indicates an evaluation item having a lower counted number of one or more predetermined words correlated thereto in the one or more review messages has a lower display order; and send the plurality of images to the terminal so that the plurality of images are displayed at the terminal in the order determined.

8. The travel service information display system according claim 1, wherein the evaluation code causes at least one of said at least one processor to determine the higher number of evaluations based on a higher number of occurrences of the one or more predetermined words included in the review information, and determine the lower number of evaluations based on a lower number of occurrences of the one or more predetermined words included in the review information.

* * * * *